Aug. 20, 1940.    G. W. HAURY    2,211,776
RESILIENT COUPLING FOR TUBING AND METHOD FOR MAKING THE SAME
Filed Aug. 2, 1937

Inventor:
George W. Haury

Patented Aug. 20, 1940

2,211,776

UNITED STATES PATENT OFFICE 2,211,776

RESILIENT COUPLING FOR TUBING AND METHOD FOR MAKING THE SAME

George W. Haury, Lakeland, Fla.

Application August 2, 1937, Serial No. 156,922

7 Claims. (Cl. 285—90)

My invention relates to couplings for tubing, and more particularly to a coupling for metallic tubing which is subject to exceptional vibration during use.

One object of my invention is the provision of a new and improved coupling for tubing which will firmly clamp the tubing in position and allow vibratory motion of the joint without any permanent displacement or change in the original position of the coupled members.

Another object is the provision of a method for forming a new and improved resilient coupling for a tube in which the tube is perforated near the end and in which the compressive force applied to the coupling members is used to compress a resilient sleeve of arbitrary cross section into the perforated portion of the tube, in order to make a non-separable fluid tight coupling.

Still another object is the provision of a new and improved coupling for tubing utilizing perforations made in the end of the tubing to be coupled in which a resilient sleeve of arbitrary cross section is squeezed between coupling members with such force that its density and resistance to shear are measurably increased and the sleeve itself simultaneously pressed into the perforations in order to form a fluid tight joint which cannot be separated without disengaging the members of the coupling.

Further objects and advantages of my invention will become apparent as the description proceeds taken in connection with the accompanying drawing which forms a part of this specification.

Figure 1:
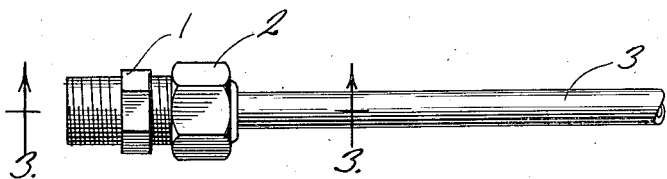
Fig. 1 is an elevation of the coupling connected with a length of tubing.
Figure 2:
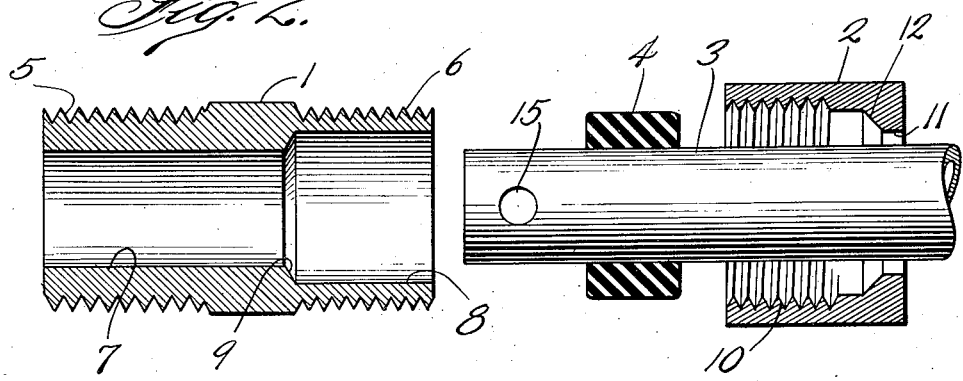
Fig. 2 is a view showing parts of the coupling together with a tube positioned ready for assembly.

While I have shown in the drawing and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

In my copending application Serial No. 104,256, filed October 6, 1936, Patent No. 2,174,105 dated September 26, 1939, for a resilient coupling, I disclosed a resilient coupling or joint formed by coupling together two coupling members and a resilient sleeve of arbitrary cross section, in such a manner that the sleeve is compressed between the members and forced into intimate contact with a configuration purposely formed on the tubing near the coupled end thereof. The present invention is an improvement over the first and while making use of some of the principles disclosed in my Patent No. 2,174,105, in addition, discloses a method of making up a coupling by the utilization of a configuration on the tubing of a particularly novel character.

Several requirements must be taken into consideration in forming a resilient coupling of this type. It is desirable, for example, not to reduce either the inside diameter of the tubing or that of a passage through the coupling used with the tubing, since any restriction thus produced would hinder the flow of fluid. Another requirement is that the configuration formed upon the tubing should not appreciably increase the outer diameter of the tubing, since it is desirable from the point of view of convenience to construct the configuration in the tubing at a time when the tubing itself can be most easily and conveniently handled, so that when the tubing is eventually bent into some out of the way position which it will finally occupy, no difficulty will be encountered in assembling it, quickly and easily with the coupling members.

In view of these requirements, there has been provided a method for making up a novel resilient coupling free from the objections above noted which comprises a body portion 1, a nut 2 for clamping a tubing 3 and a resilient sleeve 4 of rubber or some similar material having an arbitrary cross section to complete the coupling.

Upon inspection of the drawing, it will be noted that the body 1 has a threaded end 5 at the left and a threaded portion 6 at the right adapted to engage the nut. Within the body 1 at the left there is a bore 7 approximately equal in diameter to the inside diameter of the tubing 3 and at the right, an enlarged cylindrical interior portion 8, larger in diameter than the tubing 3, so that when the tubing is inserted therein, an appreciable clearance remains. Between the bore 7 and the enlarged portion 8, there is a shoulder 9, one function of which is to prevent material comprising the resilient sleeve from being compressed further than necessary into the coupling, should the material comprising the resilient sleeve be softer than usual.

The nut member 2 consists primarily of a hexagonal nut like portion having formed therein threads 10 adapted to engage the threaded portion 6 of the body 1. In the nut is an aperture 11 which provides ample space for the insertion of a length of tubing 3. Since the aperture 11 is smaller than the bore of the threaded portion 10, there is provided a shoulder portion 12 effective to confine the resilient sleeve when the coupling is assembled.

Figure 3:
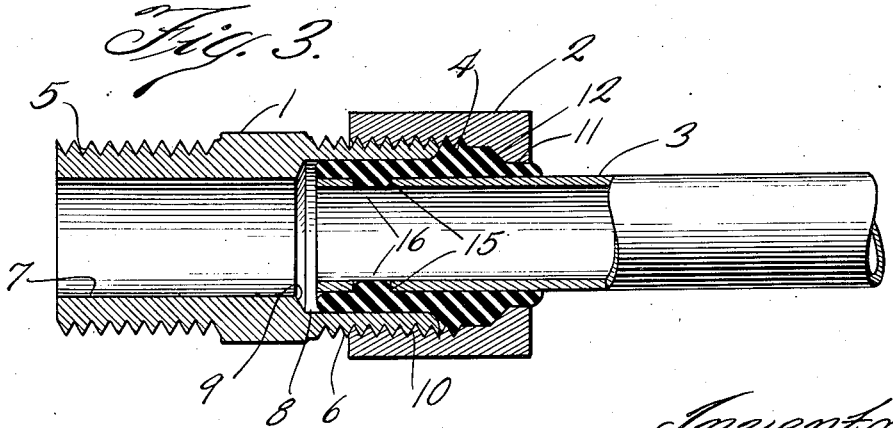
Fig. 3 is a cross section on the line 3—3 of Fig. 1.

The tubing 3 has perforations formed near the coupled end which are here shown as a pair of diametrically disposed holes 15. Positioned upon the tubing adjacent the perforations or holes 15 is the resilient sleeve 4 which, when the coupling is assembled, is moved to a position surrounding the perforations 15 as shown in Fig. 3.

When it is desired to assemble a joint of this type, the perforations 15 are first made in the tubing by some suitable means such as punching or drilling; then the nut 2 is slid over the tubing past the perforations and the resilient sleeve 4 is pushed into place upon the tubing adjacent the perforations 15. Next the end of the tubing is inserted into the enlargement 8 of the body to such a depth that it approaches, but does not quite touch the inner shoulder 9. The nut 2 is moved along the tubing 3 so that the threads 10 are enabled to engage the threaded portion 6 of the body 1. As the nut 2 is screwed more tightly upon the body 1, the resilient sleeve 4 is compressed into a pocket remaining between the outside of the tubing and the insides of the coupling members. Because of the perforations being positioned at the end of the tube adjacent the area of pressure, the resilient sleeve is squeezed into the form of buttons 16 at the perforations 15 as well as being distorted so as to completely fill the space between the coupling members and the tube.

It should furthermore be noted that, by reason of compressing this resilient sleeve into place, the materials comprising it may be compacted together so that the sleeve, and particularly the button portions 16 thereof extending into the perforations, may have considerably greater density than that possessed in its initial condition producing thereby an increasing resistance to shear at the buttons 16.

Consequently, when it is attempted to separate the joint without first unscrewing the nut, there is so much resistance offered by the resilient member, confined, as indicated, in the perforations, that a resilient joint results, possessing substantially the same strength and greater resilience than commonly present in metallic joints.

It will also become apparent that due to this high compression of the resilient sleeve, the portions thereof compacted into the perforations 15 of the tubing need not extend to a depth greater than the thickness of the tubing in order to supply the desired resistance against separation. There is, therefore, no obstruction causing a restriction of the flow of liquid through the tubing and the compacted resilient material furnishes an efficient fluid tight seal to prevent the escape of any fluid which might be confined under pressure within the tubing.

There has thus been provided a method for forming a resilient coupling of extreme simplicity capable of withstanding great vibrations without fracture, and which provides for assembly in a simple and practical manner.

I claim as my invention:

1. A method of forming engaging members and a yieldable sleeve into a resilient coupling for tubing comprising forming an aperture in the tubing near the end to be coupled, placing one member together with the sleeve upon the tubing, then placing the tubing within another of the members and coupling together said members with sufficient force to compress the sleeve and project it into the apertured portion of the tubing in order to form a fluid tight resilient joint.

2. A method of forming engaging members and a yieldable sleeve having a cross section of conventional geometric shape into a resilient coupling for tubing comprising perforating the tubing near the end to be coupled, placing one member upon the tubing and placing the sleeve thereon adjacent but not engaging the perforations, then placing the tubing within another of the members and coupling together said members with sufficient force to compress the sleeve to a more dense consistency and to elongate it and project it into the perforated portion of the tubing in order to fill said perforated portion and form a fluid tight resilient joint.

3. A method of forming engaging members and a yieldable sleeve having a mutable cross sectional shape into a resilient coupling and seal for tubing comprising making a plurality of perforations in the tubing near the end to be coupled, placing one member on the tubing and placing the sleeve thereon adjacent the perforations but separated therefrom, then placing the tubing within another of the members and coupling together said members with sufficient force to compress the sleeve and project it into the perforations in order to form a fluid tight resilient joint.

4. A method of forming engaging members and a yieldable sleeve of cross sectional area comparable to the area eventually to be occupied by said sleeve into a resilient coupling for tubing comprising making a plurality of perforations in the tubing near the end to be coupled, placing one member on the tubing and placing the sleeve thereon in a position adjacent to but out of contact with the perforations, then placing the tubing within another of the members and coupling together said members with sufficient force to compress the sleeve to a denser consistency and draw it into engagement with the perforations and to project it thereinto to a depth not exceeding the thickness of the tubing in order to form a portion of the wall thereof to produce a free flowing, fluid tight joint.

5. A resilient coupling for tubing comprising a section of tubing having a perforation preformed in the wall adjacent an end to be coupled without increase or decrease in the outside or inside diameter of the tubing within the joint, a coupling member having a passage therethrough and an elongated recess connected therewith for receiving the perforated end of the tubing, another coupling member slidable over the end of the tubing and adapted to engage the first member, and a compressible resilient nonmetallic sleeve of arbitrary cross section positionable on the tubing adjacent to but out of complete contact with the perforated portion, said sleeve being adapted to have the shape thereof altered by pressure exerted by coupling together said members and to be forced longitudinally and projected into the elongated recess to form a complete and intimate contact with the tubing and projected radially into the perforated portion thereof to fill said portion to a level substantially even with the inside surface of the tubing, said sleeve in altered form being operable simultaneously to supply a resistance to shearing force tending to separate the coupling and to provide a sealed fluid tight connection.

6. A method of manually reforming a resilient ring of random cross section into a binding medium for a resilient coupling for tubing comprising forming a number of apertures in the tubing near the end, sliding a member of the coupling over the end of the tubing, sliding the ring over the tubing and past the apertures therein to a position inward from the end, then placing said end of the tubing into another coupling member and drawing said coupling members together so as to project the ring into a cross section of particular shape suitable both to fill said apertures with a portion thereof and to separate the tubing from the coupling by filling in the clearance therebetween with a portion of the ring.

7. A method of forming threaded coupling members and a loose fitting yieldable sleeve into a resilient coupling for tubing comprising forming the wall of the tubing into an anchoring means, and then using the compressing force exerted when threading the coupling members together to change the sleeve from an original shape selected at random into a form extended by said pressure into a space between the loose fitting tube and said members and projecting portions of said sleeve into engagement with said anchoring means to retain the tube within the coupling.

GEORGE W. HAURY.